Figure 1:
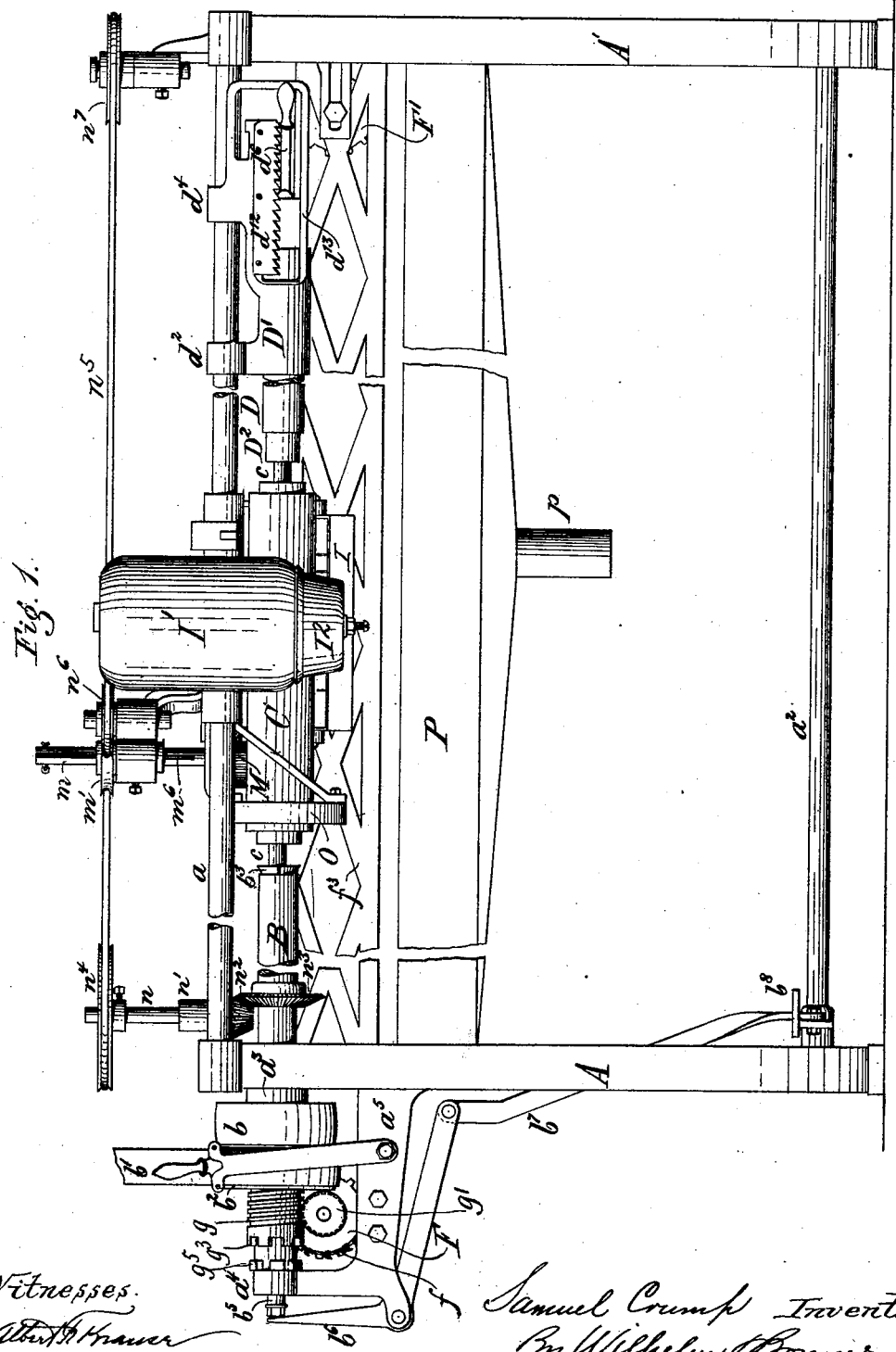

No. 696,134. Patented Mar. 25, 1902.
S. CRUMP.
MACHINE FOR CLEANING PRINTERS' ROLLERS.
(Application filed Nov. 26, 1901.)
(No Model.) 5 Sheets—Sheet 1.

Witnesses. Samuel Crump Inventor
By Wilhelm Bonner
Attorneys.

No. 696,134. Patented Mar. 25, 1902.
S. CRUMP.
MACHINE FOR CLEANING PRINTERS' ROLLERS.
(Application filed Nov. 26, 1901.)
(No Model.) 5 Sheets—Sheet 2.

Witnesses. Samuel Crump, Inventor.
By Wilhelm Bonner, Attorneys.

No. 696,134. Patented Mar. 25, 1902.
S. CRUMP.
MACHINE FOR CLEANING PRINTERS' ROLLERS.
(Application filed Nov. 26, 1901.)
(No Model.) 5 Sheets—Sheet 3.
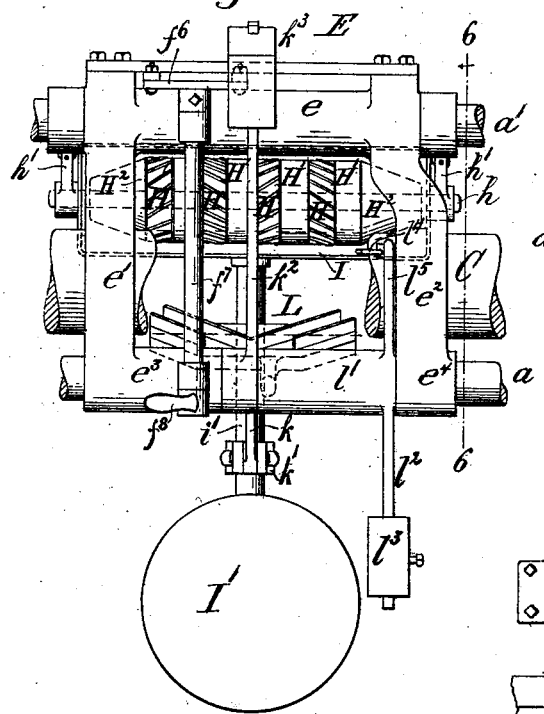
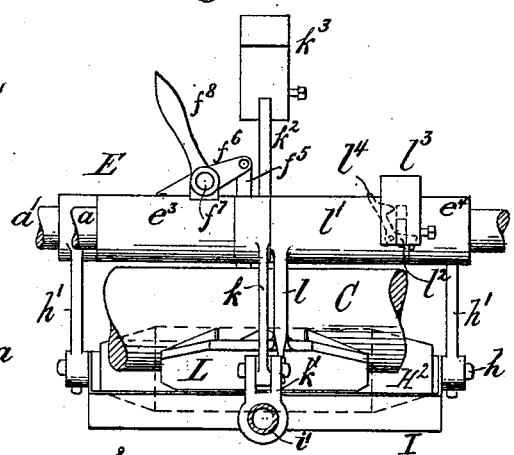
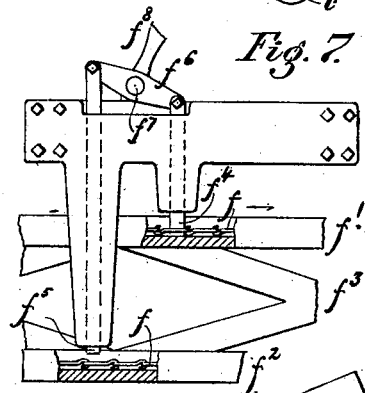
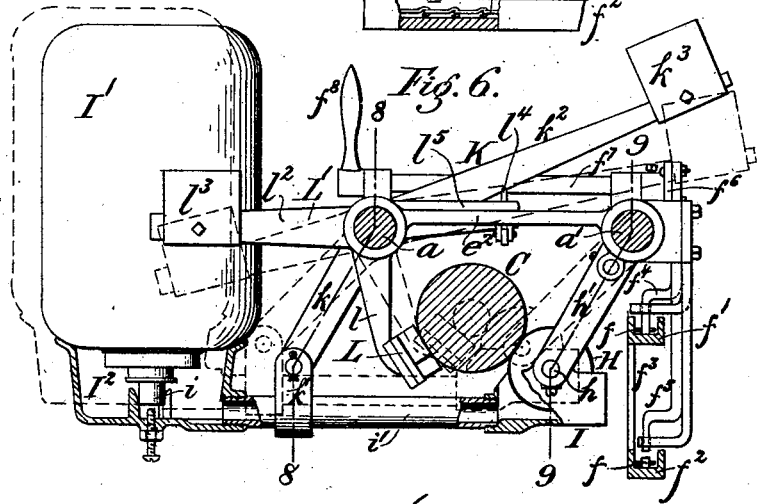
Witnesses: Samuel Crump, Inventor.
By Wilhelm Bonner, Attorneys.

No. 696,134. Patented Mar. 25, 1902.
S. CRUMP.
MACHINE FOR CLEANING PRINTERS' ROLLERS.
(Application filed Nov. 26, 1901.)
(No Model.) 5 Sheets—Sheet 4.
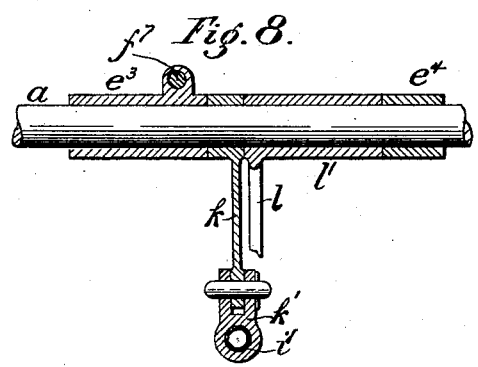
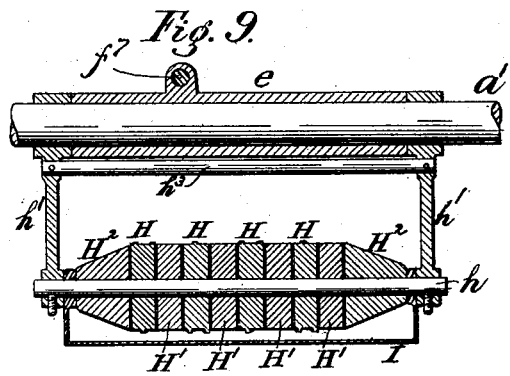
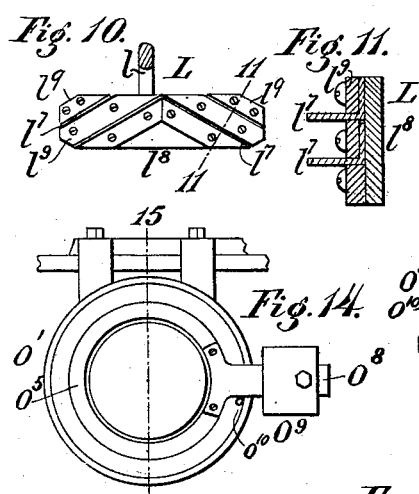
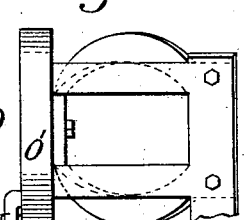
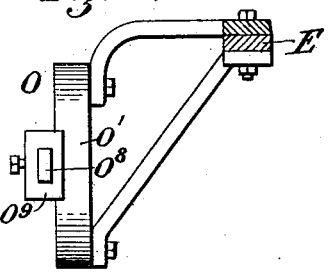
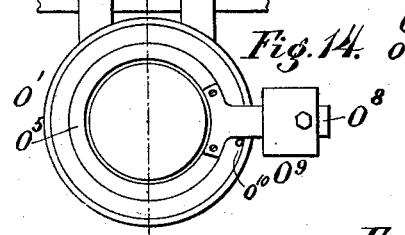
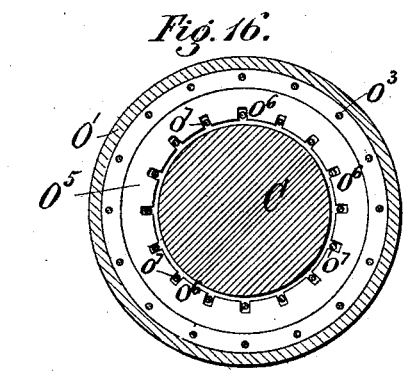
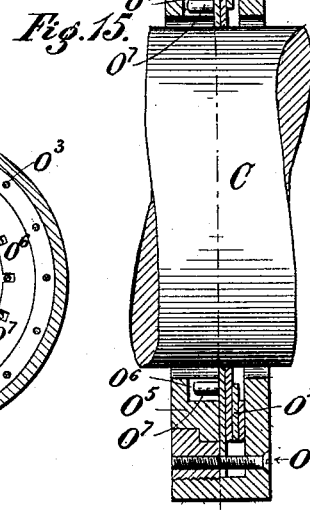
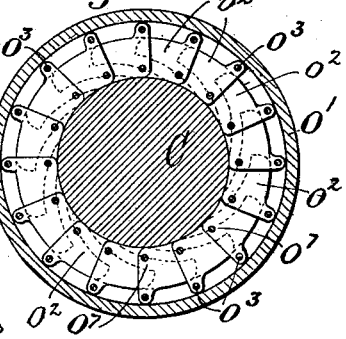
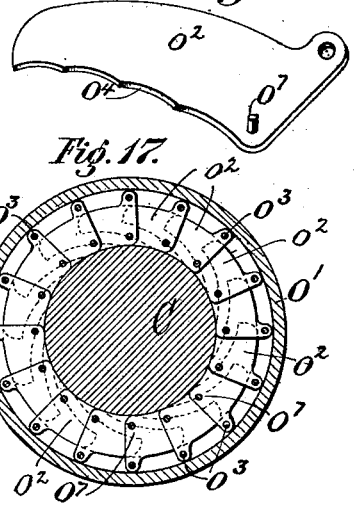
Witnesses:
Samuel Crump, Inventor.
By Wilhelm & Bonner,
Attorneys.
THE NORRIS PETERS CO., PHOTO-LITHO., WASHINGTON, D. C.

No. 696,134. Patented Mar. 25, 1902.
S. CRUMP.
MACHINE FOR CLEANING PRINTERS' ROLLERS.
(Application filed Nov. 26, 1901.)
(No Model.) 5 Sheets—Sheet 5.
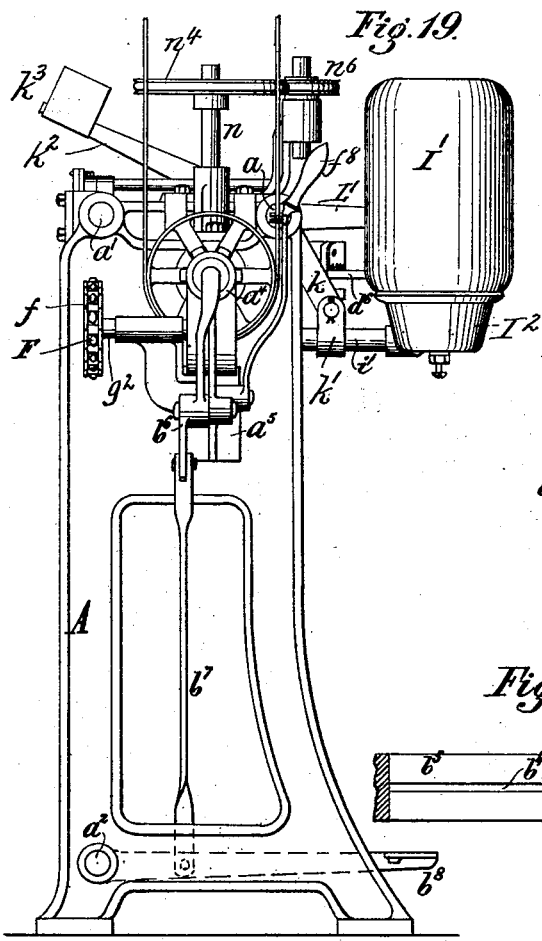
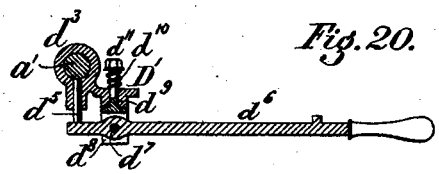
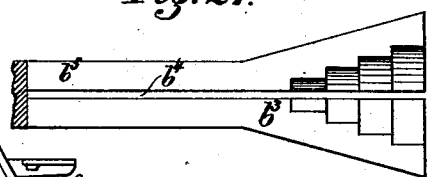
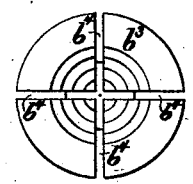
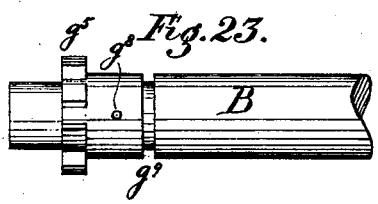
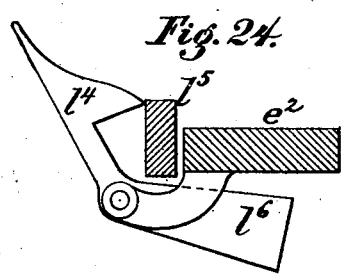
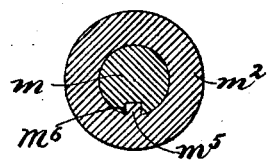
Witnesses:
Samuel Crump, Inventor.
By Wilhelm Bonner
Attorneys.
THE NORRIS PETERS CO., PHOTO-LITHO., WASHINGTON, D. C.

UNITED STATES PATENT OFFICE.

SAMUEL CRUMP, OF POUGHKEEPSIE, NEW YORK, ASSIGNOR TO PRINTERS ROLLER WASHING MACHINE COMPANY, OF NEW YORK, N. Y.

MACHINE FOR CLEANING PRINTERS' ROLLERS.

SPECIFICATION forming part of Letters Patent No. 696,134, dated March 25, 1902.

Application filed November 26, 1901. Serial No. 83,715. (No model.)

*To all whom it may concern:*

Be it known that I, SAMUEL CRUMP, a citizen of the United States, and a resident of Poughkeepsie, in the county of Dutchess and State of New York, have invented new and useful Improvements in Machines for Cleaning Printers' Rollers, of which the following is a specification.

This invention relates to a machine for cleaning printers' rollers by means of a suitable solvent or cleansing liquid which is applied to the roller under treatment and whereby the ink and other adhering matters are loosened, so that they can be removed by a scraping or other cleaning device which acts upon the roller covered with the cleaning liquid or solvent.

The object of my invention is to produce a machine for this purpose which is simple in construction, which removes the ink and other adhering matters quickly and thoroughly from the roller under treatment, which cleans leather-covered rollers without injury to the longitudinal seam of the leather cover, which produces a soft or napped surface on leather-covered rollers, which operates upon rollers of different diameters without requiring adjustment of the parts, and which possesses other advantages.

My improved machine in its most complete form comprises, briefly stated, rotary supports between which the printer's roller to be cleaned is clamped and by which it is rotated, rubbing-rollers which apply the solvent or cleansing liquid to the rotating roller and work the liquid into the surface thereof, a scraping or wiping device by which the layer of solvent, ink, and other matters covering the roller is removed therefrom, a traveling carriage in which the cleaning-roller, the scraping or wiping device, and other instrumentalities operating upon the roller are mounted and which is moved lengthwise of the rotating roller, so as to move these instrumentalities along the cylindrical surface of the same, a cleaner-disk, which is also mounted in said carriage and which acts with its flat working face against the roller, and an annular stripper, which is also mounted in said carriage and which surrounds the roller and removes any remaining liquid and impurities therefrom.

Figure 2:
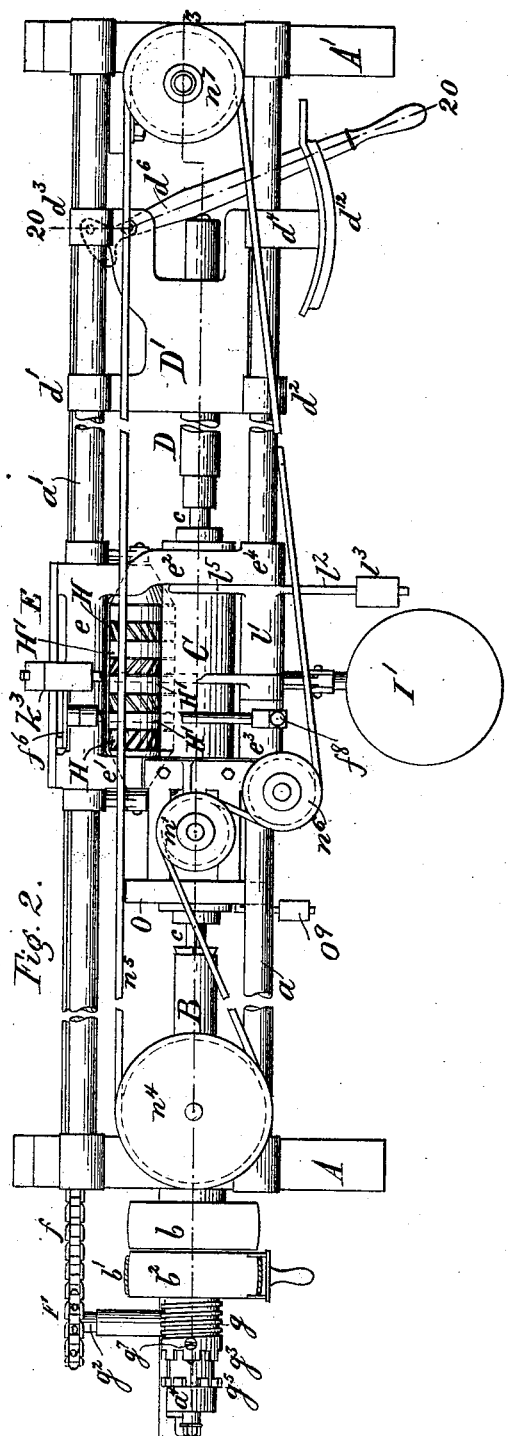
Figure 3:
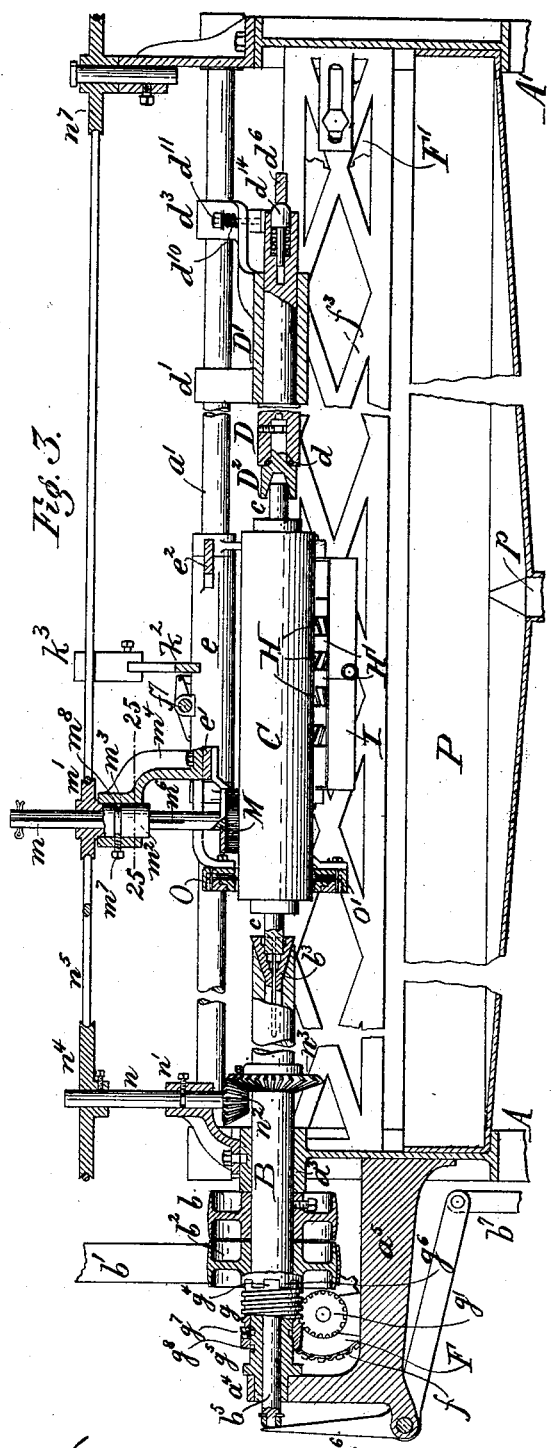

In the accompanying drawings, consisting of five sheets, Figure 1 is a front elevation of a roller-cleaning machine embodying my improvements, the longitudinal parts of the machine being broken away to shorten the length of the figure. Fig. 2 is a top plan view of the machine. Fig. 3 is a central longitudinal sectional elevation in line 3 3, Fig. 2. Fig. 4 is a top plan view, on an enlarged scale, of the traveling carriage and the rubbing-rollers and scaper and connecting parts mounted in the same. Fig. 5 is a front elevation of the traveling carriage and connecting parts, the solvent-receptacle being removed. Fig. 6 is a vertical transverse section through the machine in line 6 6, Fig. 4, showing an end view, partly sectional, of the traveling carriage and connecting parts. Fig. 7 is a rear elevation of the coupling device by which the traveling carriage is connected with the actuating-chain. Fig. 8 is a vertical section in line 8 8, Fig. 6. Fig. 9 is a similar section in line 9 9, Fig. 6. Fig. 10 is a face view of the scraper. Fig. 11 is a vertical section through the scraper in line 11 11, Fig. 10, on an enlarged scale. Fig. 12 is a top plan view of the annular stripper mounted on the carriage. Fig. 13 is a front elevation of the same. Fig. 14 is a side elevation of the annular stripper viewed from the left in Figs. 2, 12, and 13. Fig. 15 is a vertical section, on an enlarged scale, of the annular stripper in line 15 15, Fig. 14. Fig. 16 is a sectional side elevation of the stripper on a smaller scale than Fig. 15, the section being taken in line 16 16, Fig. 15, looking to the left in that figure. Fig. 17 is a similar view in line 16 16, Fig. 15, looking to the right. Fig. 18 is an enlarged perspective view of one of the blades on the annular stripper. Fig. 19 is an end elevation of the machine viewed from the left in Fig. 1. Fig. 20 is a vertical transverse section through the locking-lever of the support in which the dead-spindle is mounted, the section being taken in line 20 20, Fig. 2. Fig. 21 is a fragmentary longitudinal section of the socket-piece of the live-spindle on an enlarged scale. Fig. 22 is an end elevation thereof. Fig. 23 is a fragmentary plan view of the outer end of the live-spindle on an enlarged scale. Fig. 24 is a detached sectional view, on an enlarged scale, of the hook by which the scraper can be held out of engagement. Fig. 25 is a horizontal section in line 25 25, Fig. 3, through the spindle and driving-pulley of the disk-cleaner.

Like letters of reference refer to like parts in the several figures.

The main frame of the machine may be constructed in any suitable manner. As shown in the drawings, it consists of two upright end frames A A', two upper longitudinal connecting-bars $a\ a'$, and a lower connecting-bar $a^2$. This frame contains two horizontal spindles, between which the roller to be cleaned is clamped and by which such roller is rotated about its axis. These spindles may be constructed and arranged in any suitable manner, the arrangement shown in the drawings being as follows:

B represents the live-spindle. (Best shown in Figs. 1, 2, and 3.) This spindle is journaled in bearings $a^3\ a^4$, formed, respectively, on the end frame A and on a bracket $a^5$, secured to this end frame. This spindle is rotated by a tight pulley $b$ and a belt $b'$.

$b^2$ is a loose pulley, which is arranged on the outer side of the tight pulley.

C represents the printer's roller to be cleaned, and $c$ the journals thereof.

D represents the dead-spindle, which is arranged at the opposite end of the machine on a longitudinally-adjustable support D'.

The live-spindle is provided at its inner end with a socket-piece $b^3$ for the reception of one of the roller-journals $c$ and the dead-spindle with a socket-piece $D^2$ for the reception of the other roller-journal. The socket-piece $D^2$ is free to turn in the end of the dead-spindle D, and a suitable antifriction or ball bearing $d$ may be interposed between the socket-piece and the end of the spindle, as indicated in Fig. 3. The socket-piece $b^3$ of the live-spindle is split, as shown at $b^4$ in Figs. 21 and 22, and its outer surface is conical to fit the conical socket at the inner end of the spindle, so that when the journal of the roller is pushed into this socket-piece the separated parts or jaws of the latter will grasp the journal firmly and compel the roller to turn with the socket-piece and the spindle. Any other suitable means for compelling the roller to turn with the live-spindle may, however, be employed. The socket-piece $b^3$ is provided with a stem $b^5$, which extends axially through the spindle B and beyond the outer end of the latter, as shown in Fig. 3. The socket-piece is rotated with the spindle by the frictional contact of the parts and is released from the spindle when the roller is to be removed by pressing the socket-piece $b^3$ away from the tapering socket of the spindle. This pressure is conveniently applied by an elbow-lever $b^6$, pivoted to the bracket $a^5$ and bearing with its upper arm against the outer end of the stem $b^5$ of the socket-piece and having its lower arm connected by a rod $b^7$ to a treadle $b^8$, arranged in the lower portion of the machine, Figs. 1 and 19. By depressing this treadle the tapering socket-piece $b^3$ is loosened in the tapering socket, so that the sections or jaws of the socket-piece can spread apart and release the roller-journal. The live-spindle is held against longitudinal displacement by any suitable means—for instance, as shown in Fig. 3—against movement in one direction by the hub of the fixed pulley $b$ and the bearing $a^3$, and against movement in the opposite direction by a shoulder on the spindle bearing against the bearing $a^4$.

The adjustable support D' of the dead-spindle D is mounted on the upper front and rear bars $a\ a'$ of the frame in such manner that it can be adjusted toward and from the live-spindle as the length of the roller to be cleaned may require. Any suitable device for locking the spindle-support in its adjusted position may be employed. The locking device which is shown in the drawings, particularly Figs. 1, 2, 3, and 20, is constructed as follows:

The spindle-support D' is provided with sleeves $d'\ d^2\ d^3\ d^4$, by which it is supported and guided on the frame-bars $a\ a'$. The sleeve $d^3$, which embraces the rear bar $a'$ and is arranged nearest the end frame A', is provided on its under side with a vertical locking-bolt $d^5$, Fig. 20, which bolt is vertically movable in the sleeve, so that it can be pressed against the under side of the frame-bar $a'$ for holding the spindle-support in position on the latter and can be released when the spindle-support is to be moved on the frame-bars. This locking-bolt is applied and released by a horizontal lever $d^6$, which bears with its short rear arm against the under side of the bolt. This lever is pivoted by a horizontal pivot $d^7$ to a head $d^8$, which is connected by a vertical pivot $d^9$ to the spindle-support D' in front of the sleeve $d^3$. This vertical pivot $d^9$ is preferably provided above the spindle-support with a spring $d^{10}$ and a nut $d^{11}$, whereby the head $d^8$, carrying the lever $d^6$, is supported and enabled to yield downwardly. The short rear arm of the lever $d^6$ has the form of a flat segment-shaped head, (shown in dotted lines in Fig. 2,) so that the rear arm of the lever remains in contact with and supports the locking-bolt in the various positions of the lever. The latter is held in its adjusted position by a locking-segment $d^{12}$, which is provided on its under side with ratchet-teeth having their abrupt faces turned toward the live-spindle, so that the lever is held by engaging against the abrupt face of one of the teeth.

$d^{13}$ is a guide-bar which extends horizontally below the segment and the lever and upwardly in rear of the segment and horizontally over the rear portion of the segment and which confines the lever near the segment.

To release the spindle-support D', the front arm of the lever $d^6$ is depressed to disengage it from the segment, and the lever is swung rearwardly beyond the segment and up over the rear portion of the segment. This releases the locking-bolt $d^5$ and allows the spindle-support to be shifted on the frame-bars. Assuming that a printer's roller to be cleaned has been engaged with one of its journals in the socket-piece $b^3$ of the live-spindle, the spindle-support D' is now moved on the supporting frame-bars toward the live-spindle until the other journal of the roller is engaged in the socket-piece $D^2$ of the dead-spindle. The lever $d^6$ bears against the rear end of the dead-spindle, preferably by means of a spring-pressed bolt $d^{14}$, Fig. 3, seated in the spindle, and is swung with its front end toward the live-spindle to tighten the roller-journals in the socket-pieces of the spindles and is interlocked with the segment when the roller has been clamped to the spindles. The same tightening movement of the lever also tightens the locking-bolt $d^5$, whereby the spindle-support D' is secured in position.

E is a traveling carriage, which is movable on the stationary frame of the machine in a direction parallel to the axis of the roller to be cleaned and which carries the several instrumentalities which operate upon the roller for cleaning the same. This carriage may be moved back and forth on the stationary frame by any suitable mechanism. The mechanism shown for that purpose in the drawings, particularly Figs. 1 to 7 and 19, is constructed as follows:

The carriage is composed of a longitudinal rear sleeve $e$, which slides on the rear frame-bar $a'$, and two forwardly-projecting arms $e'$ $e^2$, which are provided at their front ends with sleeves $e^3$ $e^4$, respectively, which slide on the front frame-bar $a$.

$f$ represents a traveling endless chain, which is arranged in the vertical frame lengthwise on the rear side of the machine and which runs around a driving sprocket-wheel F and a driven sprocket-wheel F'. The upper and lower reaches or stretches of the chain are supported by upper and lower channeled guides $f'$ $f^2$, preferably formed on a light frame $f^3$, which is secured to the stationary main frame. A coupling device is provided on the carriage for attaching it to the upper or lower stretch of the chain, for moving the carriage in one or the other direction, or for disconnecting the carriage from the chain when no movement of the carriage is required. This coupling device is best shown in Figs. 4 to 7 and consists of a short coupling-bolt $f^4$ for connection with the upper reach of the chain and a long coupling-bolt $f^5$ for connection with the lower reach, both connected to a rock-lever $f^6$, secured to the rear end of a horizontal shaft $f^7$, which extends forwardly over the carriage and is provided at the front end with a handle $f^8$. In the position of the parts shown in Fig. 7 the short bolt $f^4$ is in engagement with the upper reach of the chain, which travels in the direction indicated by the arrow to the right in that figure or toward the live-spindle, and the carriage is therefore moved forwardly or toward the live-spindle. The long bolt $f^5$ is out of engagement with the lower reach of the chain. Upon reversing the rock-lever $f^6$ the long bolt can be engaged with the chain and the short bolt disengaged therefrom for returning the carriage, and by placing the rock-lever in the intermediate horizontal position both bolts are disengaged from the chain and the carriage remains at rest. The chain is driven from the live-spindle by any suitable means, and the driving mechanism of the machine is preferably so arranged that the carriage can be propelled while the roller to be cleaned is being rotated and also while the roller is at rest. As shown in the drawings, (Figs. 1, 2, and 3,) the driving mechanism is constructed as follows:

$g$ is a worm which engages with a worm-wheel $g'$ on the shaft $g^2$ of the driving sprocket-wheel F. This worm is loosely mounted on the spindle and provided at opposite ends with clutch-faces $g^3$ $g^4$, the face $g^3$ being adapted to engage with a clutch-face $g^5$ on the outer end of the live-spindle and the face $g^4$ with a clutch-face $g^6$ on the hub of the loose pulley $b^2$. The worm is attached to the live-spindle, so as to hold the clutch-faces $g^3$ and $g^5$ in engagement, by any suitable fastening device—for instance, a screw $g^7$, which engages in a hole $g^8$, formed in the live-spindle, Figs. 3 and 23. For disconnecting the worm from the spindle the screw is withdrawn and the worm is shifted so as to be engaged by its clutch-face $g^4$ with the clutch-face $g^6$ of the loose pulley $b^2$, and the screw is engaged in an annular groove $g^9$, Fig. 23, formed in the spindle. This groove holds the worm in engagement with the loose pulley and permits the worm to rotate freely on the spindle. When the roller is to be rotated and the carriage is to be driven by the chain, the worm is coupled with the live-spindle, as described, and the belt is shifted to the tight pulley. When the roller is to remain stationary while the carriage is moved by the chain, the worm is coupled with the loose pulley and the belt is shifted to the latter. The machine is stopped by stopping the shaft from which the machine is driven and which is not shown in the drawings.

H H' represent rubbing-rollers, which are arranged in the traveling carriage so as to bear against the lower rear side of the roller to be cleaned, and which are preferably rotated by contact with the roller. A number of these rollers are arranged side by side upon a fixed shaft $h$, so as to turn freely thereon, Figs. 4, 5, 6, and 9. The rollers H are grooved or ribbed on their peripheral faces and alternate with the smooth-faced rollers H'. The grooves or ribs on the rollers H are preferably arranged obliquely and in opposite directions on alternate grooved rollers, as indicated in Figs. 2 and 4, so that the ink on the printer's roller is cut first in one direction and then in another. At each end of the series of rubbing-rollers there is arranged upon the shaft $h$ a tapering roller $H^2$ for the purpose of guiding the rubbing-rollers to the surface of the roller to be cleaned. The shaft $h$ is secured in the lower ends of two pendent arms $h'$, which are arranged against opposite ends of the rear sleeve $e$ of the carriage, Figs. 4, 5, and 9, and are hung loosely on the rear frame-bar $a'$. The upper portions of the arms $h'$ are rigidly connected by a horizontal rod or bar $h^3$, so that the two arms $h'$, the shaft $h$ on which the rollers are mounted, and the connecting-bar $h^3$ form a rigid frame, which is hung loosely on the frame-bar $a'$. The rubbing-rollers, arranged in the lower portion of this frame, can swing forwardly or backwardly and are carried back and forth in the stationary frame by the traveling carriage.

I represents a shallow receptacle for the solvent or other cleansing liquid which is applied to the printer's roller to be cleaned. This receptacle is arranged below the rubbing-rollers and is loosely hung on the roller-shaft $h$ by ears arranged between the end rollers and the arms $h'$, as shown most clearly in Figs. 5, 6, and 9. This receptacle has the form of an open-topped four-sided box, and the rollers H H' are so arranged in the same that they dip into the liquid contained therein and elevate the liquid and apply it to the printer's roller to be cleaned. This receptacle I is supplied with liquid in any suitable manner, but preferably from a reservoir I', which discharges the liquid from its lower end at $i$, Fig. 6, into a receiver I², from which the liquid passes by a horizontal pipe $i'$ to the receptacle I. This reservoir I' is of the well-known type which is used as the oil-reservoir of students' lamps and maintains the liquid-level automatically at the proper height in the receptacle I. The reservoir I' is supported by a lever K, which is pivoted upon the front bar $a$ of the frame and has its lower arm $k$ arranged parallel with the arms $h'$ and pivotally connected to a clip $k'$, embracing the front portion of the pipe $i'$, so that the arms $k$ and $h'$ and the pipe $i'$ and reservoir I' can swing back and forth on the frame-bars $a$ $a'$ as the rubbing-rollers H H' adapt themselves to the diameter of the printer's roller C under treatment, which may be greater or less, as such printers' rollers are usually made of standard sizes ranging from two to three and a half inches in diameter. The upper arm $k^2$ of the lever $k$ extends rearwardly and is provided with a weight $k^3$, which overbalances the weight of the reservoir I' and contents and the rubbing-rollers H H' and connecting parts and presses the rubbing-rollers against the printer's roller. The hanger-arms $h'$ and the lever-arm $k$, hung loosely upon the fixed frame-bars $a$ $a'$ and connected by pivotal joints with the receptacle I and the pipe $i'$, respectively, form a parallelogram having its upper side fixed by the frame-bars $a$ $a'$ and its lower side movable forwardly and upwardly and backwardly and downwardly, whereby the pipe $i'$ and the receptacle I are maintained in their normal horizontal position and the reservoir I' in a vertical position in the different positions of the rubbing-rollers.

L, Figs. 4, 5, 6, 10, and 11, represents a wiper, scraper, or cleaner which is mounted in the front portion of the carriage and which is pressed against the lower front side of the printer's roller for removing therefrom the film of liquid, ink, and other impurities. This wiper is secured to a depending arm $l$ of a lever L', which is mounted loosely on the front frame-bar $a$ within the carriage. The wiper-arm $l$ is arranged centrally in the carriage, Figs. 4 and 5, and is formed on a long hub $l'$ of the lever. This hub is arranged on the front frame-bar $a$, between the arm $k$ of the lever K and the sleeve $e^4$ of the carriage. The lever L' is provided with a forwardly-extending arm $l^2$, which is arranged adjacent to the sleeve $e^4$ of the carriage and provided with a weight $l^3$, by which the wiper is pressed rearwardly and against the printer's roller. The wiper may be held out of its working position when not required for use by any suitable means—for instance, by a hook $l^4$, Figs. 2, 5, 6, and 24, which is pivoted to the arm $e^2$ of the carriage and engages over a rearwardly-projecting arm $l^5$, formed on the hub $l'$ adjacent to the arm $e^2$. This hook is provided at its lower end with a tailpiece $l^6$, which is struck by the arm $l^5$ as the latter is swung down and which swings the hook over the arm, so as to engage therewith. Before the wiper reaches the printer's roller under treatment as the carriage moves forwardly the wiper is held out of engagement by this hook, and when the wiper has passed the front end of the roller the hook is released and the wiper is swung against the roller by the overhanging weight $l^3$.

The working face of the wiper or scraper L may be constructed in various ways, depending somewhat upon the nature of the rollers which are to be cleaned. A very satisfactory construction of the working face is that shown in Figs. 10 and 11, and consists of thin blades of suitable metal $l^7$, which are secured to a back plate $l^8$ so as to project edgewise therefrom. These blades are preferably arranged obliquely and on opposite sides of the central line of the wiper in opposite directions, as shown, and impinge with their edges against the roller. The blades are conveniently secured to the back plate by being bent to an angular form, so that each blade is provided with a base-flange, as shown in Fig. 11, which flange is secured to the back plate by an overlying strip $l^9$. The wiper-blades being arranged obliquely and in opposite directions work first one way and then another, whereby all depressions and imperfections in the surface of the roller are thoroughly cleaned out. As the blades are arranged obliquely, they intersect the longitudinal seam of a leather-covered roller at an angle, whereby injury to the same is prevented. This scraper or wiper removes the film of turpentine or other cleansing liquid without reducing the same to fine particles or atomizing the same, whereby the generation of inflammable vapor during the operation of the machine is avoided.

M represents a disk-shaped cleaner, which is arranged to bear with its flat face against the roller to be cleaned. This cleaner is secured to the end of a rotary spindle or shaft $m$, which is preferably arranged vertically above the roller to be cleaned. As shown in the drawings, Figs. 1 to 3, the spindle $m$ of this cleaner is driven by a pulley $m'$, having a downwardly-extending hub $m^2$, which is journaled in a bearing $m^3$, formed at the upper end of an arm $m^4$. The latter is secured upon the arm $e'$ of the carriage E, which is nearest the live-spindle. The vertical spindle $m$ is so connected with the hub of this pulley that the spindle while being driven from the pulley is free to move up or down in the same as the size of the printer's roller may require upon which the cleaner-disk bears. For this purpose the hub of the pulley is provided in its bore with a driving projection or key $m^5$, Fig. 25, which projects into a keyway $m^6$ in the spindle, Figs. 3 and 25. The pulley is held in the bearing $m^3$ against vertical displacement by any suitable means—for instance, by a screw $m^7$, Fig. 3, secured in the bearing and projecting into an annular groove $m^8$ in the hub of the pulley. The pulley is driven by any suitable means in such a way that the spindle is rotated while the carriage is moved back and forth on the stationary frame. The mechanism shown for this purpose in the drawings is constructed as follows: $n$ is an upright shaft, which is journaled in a bearing $n'$, secured to the end frame A over the live-spindle and driven at its lower end from the latter by bevel-wheels $n^2 n^3$. $n^4$ is a horizontal driving-pulley, which is secured to the upper end of this shaft and around which the driving band, belt, or cord $n^5$ passes. This band passes from the driving-pulley $n^4$ around the rear side of the pulley $m'$ and forwardly around a guide-pulley $n^6$, mounted upon the front portion of the carriage, then to the opposite end of the machine and around a guide-pulley $n^7$, mounted thereon, and then back to the driving-pulley $n^4$. The flat working face of this rotary cleaner-disk may be constructed in various ways—for instance, if this cleaner is intended to work on leather-covered printers' rollers the working face may be constructed of card-clothing having sharp teeth which act upon the leather surface in such a way as to produce a soft, chamois-like, or napped surface. This rotary cleaner-disk also removes from the printer's roller the remaining adhering foreign matter—such as traces of ink, paper fiber, &c.—and tends to reduce the roller to uniform diameter when the roller has become uneven by hard spots formed on its surface or otherwise. By subjecting the roller to a mechanical abrading device of this kind the surface of the roller is rendered more uniform. In some cases the flat working face of the rotary cleaner may be composed of sandpaper or similar abrading material or of card-clothing provided with flat-ended or dull teeth. The flat working face of this abrading or cleaner disk operates on opposite sides of its axis upon the printer's roller in opposite directions, whereby the surface of the roller is first worked in one direction and then in the opposite direction. This intensifies the action of the disk materially and greatly improves the condition of the surface of the roller. When the spindle of the cleaner-disk is arranged vertically, as shown in the drawings, the disk rests upon the roller by gravity.

O represents an annular stripper, which is attached to the traveling carriage and arranged transversely to the axis of the roller to be cleaned, so that this stripper surrounds the roller and bears upon the surface thereof in being moved with the carriage lengthwise over the roller. This stripper may be employed for removing from the surface of the roller any traces of liquid, ink, or other adhering matter. This stripper, which is indicated in Figs. 1 to 3 and shown most clearly in Figs. 12 to 17, is constructed as follows:

$O'$ represents an annular frame, which is secured to the carriage E at one end thereof and which depends below the carriage in such a position that the center of this annular frame is in line with the axes of the spindles B and D.

$O^2$ represents an annular series of stripper-blades, which are each pivoted at one end by a pivot $O^3$ to the annular frame $O'$ and which have their inner or working faces $O^4$ preferably so shaped that different portions of each face will correspond in concavity with the curvature of the different standard sizes of printers' rollers which are to be cleaned. For instance, as indicated in Fig. 18, the inner stripping-face of the blade is composed of four concave sections of progressively larger radius from the outer to the pivoted end of the blade. These blades are closed against the roller operated upon by a ring $O^5$, which is arranged within the annular frame $O'$ and which engages with the annular series of stripper-blades by any suitable means—for instance, as shown in Figs. 15 to 18, by notches $O^6$, formed in the inner edge of the ring and engaging with pins $O^7$, one of which is formed on the heel of each blade near the stripping edge thereof. The ring $O^5$ is turned in the proper direction for tightening these blades against the roller by a laterally-projecting arm $O^8$, provided with a weight $O^9$, Figs. 12 to 14. As the stripper completely surrounds the roller, all liquid and other matter adhering to the roller are driven before the stripper until the end of the roller is reached.

P represents a trough arranged lengthwise between the end frames A A' underneath the carriage for receiving the liquid, ink, and other impurities which are removed from the printer's roller. This trough is provided with a waste-pipe $p$ for discharging this material into a bucket.

The printer's roller is cleaned by clamping it between the spindles, so as to be rotated, and causing the carriage to travel along the roller once or several times, as the condition of the roller may require. During this movement of the carriage the rubbing-rollers H H' apply the cleaning liquid to the roller and cut up the ink and other impurities on the roller and rub or work the cleansing liquid into the surface of the printer's roller. The scraper or wiper L removes the loosened layer of material from the surface of the roller, and the cleaner-disk finishes the surface. When the roller has been so cleaned and it is desired to remove from the roller any traces of liquid, ink, or other adhering matter by means of the annular stripper, the live-spindle is disconnected from the worm and the carriage is moved along the roller without turning the latter, the scraper L being supported by the hook $l^4$ out of its working position and the cleaner-disk being supported clear of the roller by any suitable means. The blades of the annular stripper bear against the roller all around the same during this movement of the carriage and remove any remaining traces of adhering matter. When the scraper L and the cleaner-disk M are in operation, the annular stripper is held open, so as not to bear upon the roller by any suitable means—for instance, by supporting the weighted arm $O^8$ by a removable pin $O^{10}$, secured to the annular frame O'.

The mechanical construction of the parts of this machine can be modified in many respects without materially changing the general organization and the operation of the same.

I claim as my invention—

1. The combination of means for rotating the printer's roller about its axis, a rotary rubbing device which works a cleaning liquid into the surface of the roller, a traveling support which is movable lengthwise of said roller and to which said rubbing device is attached, propelling mechanism for operating said support, and a wiping or scraping device by which the liquid and impurities are removed from the roller, substantially as set forth.

2. The combination of means for rotating the printer's roller about its axis, means for working a cleaning liquid into the surface of said roller, a wiping or scraping device by which the liquid and impurities are removed from said roller, a traveling carriage to which said wiping or scraping device is attached, and a propelling mechanism for operating said carriage, substantially as set forth.

3. The combination of means for rotating the printer's roller about its axis, means for applying a cleaning liquid to said roller, a carriage which is movable lengthwise of the roller, a rubbing device which is supported by said carriage and which works the cleaning liquid into the surface of the roller, and a wiping device which is also supported by said carriage and which removes the liquid and impurities from the roller, substantially as set forth.

4. The combination of spindles between which the printer's roller is clamped and whereby said roller is rotated about its axis, means for applying a cleaning liquid to said roller, a carriage which is movable lengthwise of the roller, a rubbing device which is supported by said carriage and which works the cleaning liquid into the surface of the roller, and a wiping device which is also supported by said carriage and which removes the liquid and impurities from the roller, substantially as set forth.

5. The combination of means for rotating the printer's roller about its axis, means for applying a cleaning liquid to said roller, a carriage which is movable lengthwise of the roller, a rubbing device supported by said carriage and capable of movement toward and from said printer's roller, and a wiping device mounted on said carriage and capable of movement toward and from the printer's roller, substantially as set forth.

6. The combination of means for rotating the printer's roller about its axis, means for applying a cleaning liquid to said roller, a carriage which is movable lengthwise of the printer's roller, rubbing-rollers which work the cleaning liquid into the surface of the printer's roller, a support in which the rubbing-rollers are mounted and which is movably connected with the carriage and permits said rubbing-rollers to move toward and from the printer's roller, and a wiping device also mounted on said carriage, substantially as set forth.

7. The combination of means for rotating the printer's roller about its axis, means for applying a cleaning liquid to said roller, a carriage which is movable lengthwise of the printer's roller, rubbing-rollers which work the cleaning liquid into the surface of the printer's roller, a support in which the rubbing-rollers are mounted and which is movably connected with the carriage and permits said rubbing-rollers to move toward and from the printer's roller, a wiping device which removes the liquid and impurities from the roller, and a support for said wiping device which is movably attached to said carriage and permits said wiping device to move toward and from the printer's roller, substantially as set forth.

8. The combination of a stationary main frame, means for rotating the printer's roller about its axis, a carriage which is movable in the main frame lengthwise of the printer's roller, rubbing-rollers, a pendent support in which the rubbing-rollers are mounted and which moves with the carriage, a wiping device, a movable support to which the wiping device is attached and which moves with the carriage, and means for applying a cleaning liquid to the printer's roller, substantially as set forth.

9. In a machine for cleaning printers' rollers, the combination of means for rotating the printer's roller about its axis, a carriage which is movable lengthwise of said roller, a rotary rubbing device, tapering guide devices arranged at the ends of said rubbing device, and a support for the rubbing and guide devices which is movable toward and from the printer's roller and moves with the carriage, substantially as set forth.

10. In a machine for cleaning printers' rollers, the combination of means for rotating the printer's roller about its axis, a carriage which is movable lengthwise of said roller, a series of rubbing-rollers arranged side by side, tapering guide-rollers arranged at the ends of the series of rubbing-rollers, and a support in which said rollers are mounted and which is movable on said carriage toward and from the printer's roller, substantially as set forth.

11. The combination of a stationary main frame, means for rotating the printer's roller about its axis, a carriage which is movable in the main frame lengthwise of the printer's roller, rubbing-rollers, a pendent frame in which the rubbing-rollers are mounted and which is movable on the carriage to move the rubbing-rollers toward and from the printer's roller, means for pressing the pendent frame and the rubbing-rollers toward the printer's roller, a wiping device, and a weighted supporting-lever for said wiping device which is connected with said carriage and presses the wiping device toward the printer's roller, substantially as set forth.

12. The combination of means for rotating the printer's roller about its axis, means for applying a cleaning liquid to said roller, a rubbing device for working the liquid into the surface of the roller, a support for the rubbing device which is movable toward and from the printer's roller, a wiping device for removing the liquid and impurities from the roller, a support for the wiping device which is movable toward and from the printer's roller, and means for producing a relative movement in the longitudinal direction of the roller between the latter and said rubbing and wiping devices, substantially as set forth.

13. In a machine for cleaning printers' rollers, the combination of means for rotating the roller about its axis, a carriage which is movable lengthwise of the roller, a rubbing device for working a cleaning liquid into the surface of the roller, a support for said rubbing device attached to said carriage and capable of movement toward and from the printer's roller, and a receptacle for the cleaning liquid which is carried by said movable support, substantially as set forth.

14. In a machine for cleaning printers' rollers, the combination of means for rotating the printer's roller about its axis, rubbing-rollers, a support in which said rollers are mounted and which is movable toward and from said printer's roller, and a receptacle for the cleaning liquid which is attached to said movable support and in which said rubbing-rollers are arranged, substantially as set forth.

15. In a machine for cleaning printers' rollers, the combination of means for rotating the printer's roller about its axis, rubbing-rollers, a pendent support in which said rollers are mounted and which is movable toward and from the printer's roller, a receptacle for the cleaning liquid which is attached to said pendent support and in which said rubbing-rollers are arranged, a supply-pipe connected with said receptacle, a liquid-reservoir mounted on said pipe, and a pendent support for said reservoir and pipe arranged parallel with said pendent roller-support, substantially as set forth.

16. In a machine for cleaning printers' rollers, the combination of means for rotating the printer's roller about its axis, rubbing-rollers, a shaft on which said rollers are mounted, pendent arms in which said shaft is supported, a liquid-receptacle which is attached to said arms and in which said rollers are arranged, a horizontal supply-pipe connected with said receptacle, a pendent arm which supports said pipe, and a liquid-reservoir mounted on said pipe, substantially as set forth.

17. In a machine for cleaning printers' rollers, the combination of means for rotating the printer's roller about its axis, a carriage which is movable in the longitudinal direction of the roller, means for supplying a cleaning liquid to said roller mounted on said carriage, a rubbing device, and a support for said rubbing device which is movable toward and from the printer's roller and which travels with said carriage, substantially as set forth.

18. In a machine for cleaning printers' rollers, the combination of means for rotating the printer's roller about its axis, a carriage which is movable in the longitudinal direction of the roller, rubbing-rollers, a pendent support in which said rollers are mounted and which moves with said carriage, a receptacle for the cleaning liquid which is attached to said pendent support and in which said rubbing-rollers are arranged, and means for supplying liquid to said receptacle, substantially as set forth.

19. In a machine for cleaning printers' rollers, the combination of means for rotating the printer's roller about its axis, a carriage which is movable in the longitudinal direction of the roller, rubbing-rollers, a pendent support in which said rollers are mounted and which moves with said carriage, a receptacle for the cleaning liquid which is attached to said pendent support and in which said rubbing-rollers are arranged, means for supplying liquid to said receptacle, a wiping device, and a rock-arm to which said wiping device is attached and which moves with said carriage, substantially as set forth.

20. The combination of a stationary main frame provided with longitudinal guide-bars, a carriage movable on said bars, spindles arranged parallel with said bars and by which the printer's roller is rotated, rubbing-rollers, a rocking support in which said rubbing-rollers are arranged and which moves with said carriage, a wiping device, a rocking support to which said wiping device is attached and which moves with said carriage, and means mounted on said carriage for supplying a cleaning liquid to the printer's roller, substantially as set forth.

21. In a machine for cleaning printers' rollers, the combination of means for rotating the printer's roller about its axis, a wiper having its face provided with blades inclined in opposite directions, means for applying a cleaning liquid to the roller, and means for producing a relative movement in the longitudinal direction of the roller between the latter and the wiper, substantially as set forth.

22. In a machine for cleaning printers' rollers, the combination of means for rotating the printer's roller about its axis, a carriage which is movable lengthwise of said roller, means for applying a cleaning liquid to said roller, and a wiper which is connected with said carriage to move therewith and movable toward and from the printer's roller and which has its face provided with blades inclined in opposite directions, substantially as set forth.

23. In a machine for cleaning printers' rollers, the combination of means for rotating the printer's roller about its axis, means for applying a cleaning liquid to said roller, a rotary cleaner-disk which has a flat working face by which it operates upon the surface of the roller, and means for producing a relative movement in the longitudinal direction of the roller between the latter and said cleaner-disk, substantially as set forth.

24. In a machine for cleaning printers' rollers, the combination of means for rotating the printer's roller about its axis, means for applying a cleaning liquid to said roller, a carriage which is movable lengthwise of said roller, and a rotary cleaner-disk which has a flat working face by which it operates upon the surface of the roller and which is mounted on said carriage, substantially as set forth.

25. In a machine for cleaning printers' rollers, the combination of means for rotating the printer's roller about its axis, means for applying a cleaning liquid to said roller, a horizontal cleaner-disk which has a flat lower face by which it operates upon the surface of the roller, a rotary spindle to the lower end of which the disk is attached, and means for producing a relative movement in the longitudinal direction of the roller between the latter and said cleaner-disk, substantially as set forth.

26. In a machine for cleaning printers' rollers, the combination of means for rotating the printer's roller about its axis, means for applying a cleaning liquid to said roller, a rotary disk brush which has a flat working face by which it operates upon the surface of the roller, and means for producing a relative movement in the longitudinal direction of the roller between the latter and said disk brush, substantially as set forth.

27. In a machine for cleaning printers' rollers, the combination of means for rotating the printer's roller about its axis, means for applying a cleaning liquid to said roller, a rubbing device which works the cleaning liquid into the surface of the roller, a rotary cleaner-disk which has a flat working face by which it operates upon the surface of the roller, and means for producing a relative movement in the longitudinal direction of the roller between the latter and said cleaner-disk and rubbing device, substantially as set forth.

28. In a machine for cleaning printers' rollers, the combination of means for rotating the printer's roller about its axis, means for applying a cleaning liquid to said roller, a rubbing device which works the cleaning liquid into the surface of the roller, a wiping device which removes the liquid and impurities from the surface of the roller, a rotary cleaner-disk which has a flat working face by which it operates upon the surface of the roller, and means for producing a relative movement in the longitudinal direction of the roller between the latter and said cleaner-disk, rubbing device and wiping device, substantially as set forth.

29. The combination of means for rotating the printer's roller about its axis, means for applying a cleaning liquid to the same, a carriage which is movable lengthwise of said roller, a rubbing device connected with said carriage for working the cleaning liquid into the surface of the roller, a wiping device connected with said carriage for removing the cleaning liquid and impurities from the roller, and a rotary cleaner-disk which is mounted on said carriage and has a flat working face by which it operates upon the roller, substantially as set forth.

30. The combination of means for rotating the printer's roller about its axis, means for applying a cleaning liquid to the same, a carriage which is movable lengthwise of said roller, rubbing-rollers mounted on a movable support connected with said carriage, a wiping device attached to a movable support connected with said carriage, and a rotary cleaner-disk which is mounted on said carriage and has a flat working face by which it operates upon the printer's roller, substantially as set forth.

31. In a machine for cleaning printers' rollers, the combination of a non-rotative annular stripper which surrounds the roller, and means for producing a relative movement in the longitudinal direction of the roller between the latter and the stripper, substantially as set forth.

32. In a machine for cleaning printers' rollers, the combination of a carriage which is movable lengthwise of the roller to be cleaned, and a non-rotative annular stripper which is attached to said carriage, substantially as set forth.

33. In a machine for cleaning printers' rollers, the combination of a stripper having an annular series of stripper-blades, and means for producing a relative movement in the longitudinal direction of the roller between the latter and the stripper, substantially as set forth.

34. In a machine for cleaning printers' rollers, the combination of a stripper having an annular series of stripper-blades, means for closing the blades against the roller, and means for producing a relative movement in the longitudinal direction of the roller between the latter and the stripper, substantially as set forth.

35. In a machine for cleaning printers' rollers, the combination of a carriage which is movable lengthwise of the roller to be cleaned, a stripper attached to said carriage and having an annular series of stripper-blades, and means for closing the blades against the roller, substantially as set forth.

Witness my hand this 19th day of November, 1901.

SAMUEL CRUMP.

Witnesses:
M. C. VAN DERBURGH,
ALLETTA WILLIAMSON.